(12) United States Patent
Mordechai et al.

(10) Patent No.: US 6,430,941 B1
(45) Date of Patent: Aug. 13, 2002

(54) INFRARED DETECTOR

(75) Inventors: Simchon Mordechai, Kefar Veradim; Avraham Neta, D.N. Misgav, both of (IL)

(73) Assignee: Rafael-Armament Development Authority Ltd., Haifa (IL)

(*) Notice: Subject to any disclaimer, the term of this patent is extended or adjusted under 35 U.S.C. 154(b) by 0 days.

(21) Appl. No.: 09/666,968

(22) Filed: Sep. 21, 2000

(30) Foreign Application Priority Data

Sep. 23, 1999 (IL) .................................................. 132035

(51) Int. Cl.⁷ .................................................. F25B 19/02
(52) U.S. Cl. ........................................ 62/51.2; 250/352
(58) Field of Search ............................ 62/51.2; 250/352

(56) References Cited

U.S. PATENT DOCUMENTS

| | | | |
|---|---|---|---|
| 2,895,303 A | * 7/1959 | Streeter | 62/51.2 |
| 4,474,036 A | 10/1984 | Dunn et al. | 250/352 |
| 4,791,298 A | 12/1988 | Ball et al. | 62/51.1 |
| 5,077,979 A | * 1/1992 | Skertic et al. | 62/51.2 |
| 5,382,797 A | * 1/1995 | Kunimoto et al. | 250/352 |

* cited by examiner

*Primary Examiner*—Ronald Capossela
(74) *Attorney, Agent, or Firm*—Merchant & Gould P.C.

(57) ABSTRACT

An infrared radiation (IR) detector device that comprises a casing, having an optical window for admitting radiation; a cold shield having a detector mounted therein and having a filter mounted between the optical window and the detector; a cooler tube in coiled configuration, having an inlet in communication with a pressurized gas source and an expansion nozzle located in the vicinity of the detector and a pre-cooling jacket, enclosing the cooler tube and having a gas inlet in the vicinity of the detector and a gas discharge vent to the outside. The cooler tube comprises a first section, beginning at the gas inlet, a second section, terminating at the expansion nozzle, and a communication between the first and second sections. The pre-cooling jacket comprises a first section, housing the first section of the cooler tube, a second section, housing the second section of the cooler tube, and a communication between the first and second sections. The first section of the jacket bounds an inner space which encloses the second section of the jacket, whereby the second section of the cooler tube, contained in the second section of the jacket, is also entirely contained in the inner space defined by the first section of the jacket and makes no contribution to the overall volume of the detector device.

12 Claims, 2 Drawing Sheets

INFRARED DETECTOR

FIELD OF THE INVENTION

The present invention relates to infrared (IR) detectors characterized in having a compact size and improved cooling efficiency.

BACKGROUND OF THE INVENTION

Infrared radiation detector devices commonly comprise a casing, an electronic IR sensitive detecting component, hereinafter "detector element", and an optical window such as a lens or an infrared transmitting means. Furthermore, said devices comprise a cryogenic cooler. By the term "cryogenic cooler" is meant herein a device which effects cooling by direct Joule-Thomson effect. The fluid used in said device may be called "cryogenic fluid". As is well known, the direct Joule-Thomson is based on the adiabatic expansion of a gas below a characteristic temperature, known as the inversion temperature, which effects cooling of the volume into which the expansion of the gas occurs, while in the reverse Joule-Thomson effect the adiabatic expansion of a gas above its inversion temperature effects heating of the surroundings.

U.S. Pat. No. 4,474,036 describes an IR detector which comprises an envelope in the form of a Dewar in which a vacuum space is present between an outer wall and an inner element, cooled by a cooling element, which may be based on the Joule-Thomson effect.

In prior art IR detector, however, the volume cannot be reduced as desired. The distance from the optical window to the detector element is fixed, based upon the optical design, and the cooling element must have a certain length, to permit an effective pre-cooling.

In some applications the size of the entire IR detector is of extreme importance. More particularly, the compact size of the detector in missile heads is of paramount importance. Due to the design of the missile head, the space allocated to the detector device is quite limited and therefore it is important to provide a detector of compact size. Furthermore, the flight of the missile causes considerable vibration of the detector, which impedes the detector's performance. A compact size of the detector device tends to provide additional rigidity to the assembly and thus to reduce the vibration of the detector and to improve its performance. Therefore, efforts have been made to design detectors of compact size.

IL 81534 describes an IR detector with a Joule-Thomson cooler comprising a housing, infrared transmitting means at its front, and a Joule-Thomson cooling element wound about a conical core and enclosed in a pre-cooling jacket, of which said core forms one of the surfaces. The cooler element is in a coiled configuration, wherein the inlet is attached to a source of pressurized gas and the outlet, which is fitted with an expansion nozzle, is located in the vicinity of the detector element. The pre-cooling jacket effects cooling of the cryogenic gas while it is flowing through the tube. Thus, gas expanding through the orifice reaches a lower temperature and effects more efficient cooling of the detector.

The spiral configuration of the cooler tube is imperative for achieving the desired pre-cooling effect. However, in spite of the spiraled configuration, which is essential for achieving the desired pre-cooling effect, the detector devices of the prior art have a relatively large volume.

It is a purpose of the present invention to provide an infrared radiation detector device comprising a tube through which a gas flows, hereinafter "cooler tube", of a sufficient length so to achieve the desired pre-cooling effect, the volume of which device is smaller than that of comparable prior art devices.

It is another purpose of this invention to provide a compact infrared radiation detector device with efficient heat exchange between the cooler tube and the discharge gas.

It is a further purpose to provide such a device having a rigid structure, which reduces the detector displacement amplitude.

It is a still further purpose to provide such a device in which the exhaust back pressure of the discharge cooling fluid is reduced, thus lowering the boiling temperature of the cooling fluid.

It is a still further purpose to provide in such a device a sufficient volume for self regulated flow minicooler systems.

Other purposes and advantages of the invention will become clear as the description proceeds.

SUMMARY OF THE INVENTION

The IR detector device according to the invention comprises:

a) a casing, having an optical window for admitting radiation;
b) a cold shield having a detector mounted therein and a filter mounted between said optical window and said detector;
c) a cooler tube in coiled configuration, having an inlet in communication with a pressurized gas source and an expansion nozzle located in the vicinity of the detector;
d) a pre-cooling jacket, enclosing the cooler tube and having a discharge gas inlet in the vicinity of the detector and a discharge gas vent to the outside;
e) the cooler tube comprising a first section, beginning at the inlet, a second section, terminating at the expansion nozzle, and a communication between said first and second sections;
f) the pre-cooling jacket comprising a first section which houses the first section of the tube, a second section which houses the second section of the tube, and a communication between said first and second sections;
g) the first section of the jacket bounding an inner space which encloses the second section of the jacket, whereby the second section of the cooler tube, contained in the second section of the jacket, is also entirely contained in the inner space defined by the first section of the jacket and makes no contribution to the overall volume of the detector device.

By "optical window" is meant, in this description and claims, any component that allows visible or IR radiation to pass through it, e.g. a lens or any IR transmission means.

Preferably, a portion of the cold shield extends into the inner space bounded by the first section of the pre-cooling jacket. Said first section of the pre-cooling jacket is shaped to serve this purpose, and therefore is tapered outwardly from its communication with the second section of the pre-cooling jacket.

Also preferably, means are provided for creating and maintaining a vacuum in the space bounded by the casing, and enclosing the pre-cooling jacket and the cold shield.

The expansion of the gas fed to said tube through the nozzle effects rapid cooling of the space into which the gas expands and of the surfaces of said space. The gas, after so expanding, flows through the pre-cooling jacket and in heat exchange contact, towards a vent, in front of the device near the radiation transmitting means. Said heat exchange contact results in pre-cooling of the gas entering the tube.

The detector is mounted at one end of the cold shield in the vicinity of the outlet orifice of the cooler tube. It comprises a matrix of IR radiation detector elements and an electric circuit for receiving, elaborating and transmitting the signals generated by said elements. Preferably, a filter is provided on the top of the cold shield and the detector to filter out radiation that is not in the sensitivity range of the detector elements and may be considered as parasitic radiation with respect to IR detection. These components are per se part of the prior art and need not be particularly described.

However, preferably, the conductors that connect said electric circuit to the outside are located on the outer surface of the cold shield, lead from the end of the cold shield on which the detector is mounted to the end thereof on which the filter is mounted, and are electrically connected to a conductive component, that is close to the level of the optical window, through which the electrical signals issue from the device.

DETAILED DESCRIPTION OF PREFERRED EMBODIMENTS

Figure 1:
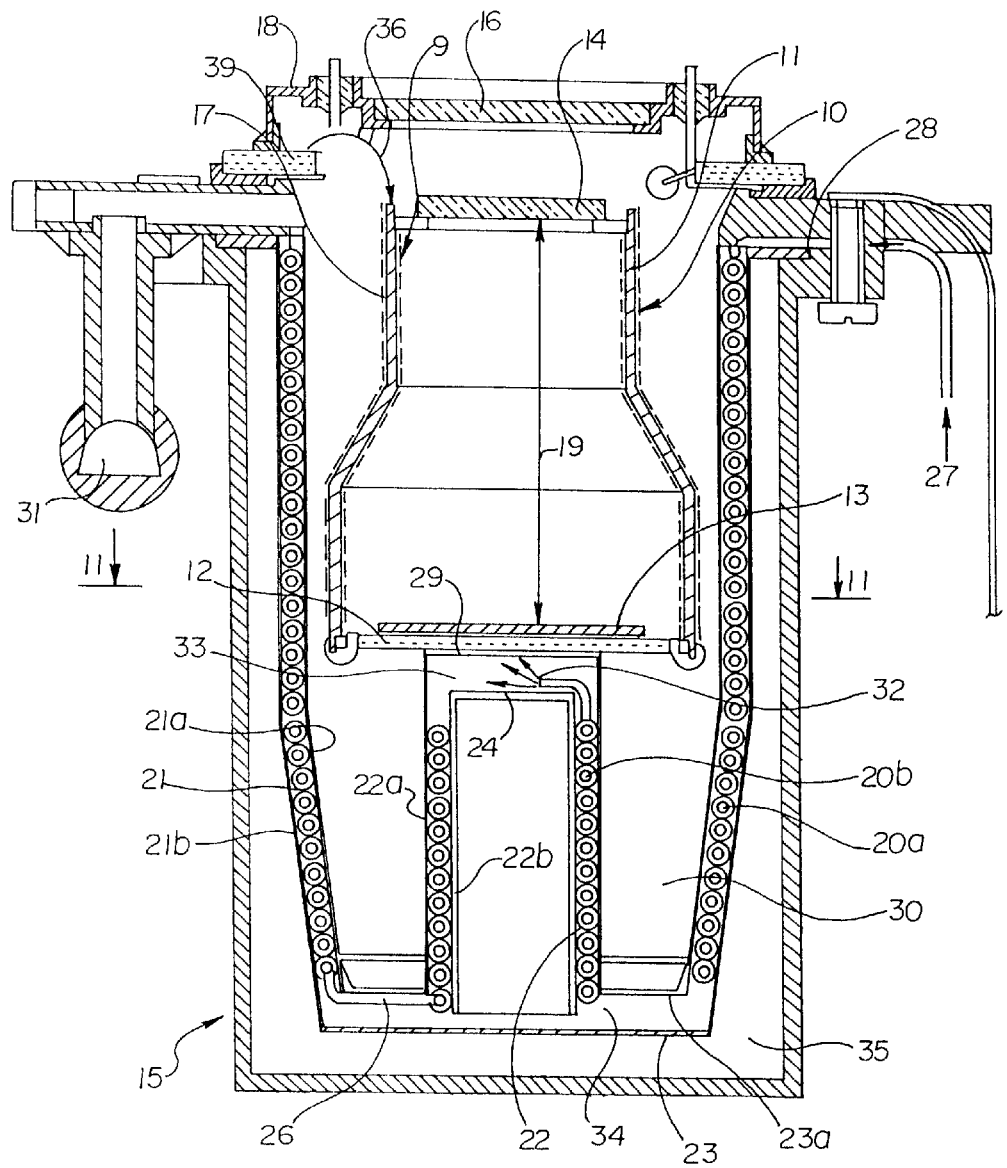
FIG. 1 is an axial cross-section of a IR detector device according to an embodiment of the present invention.
Figure 2:
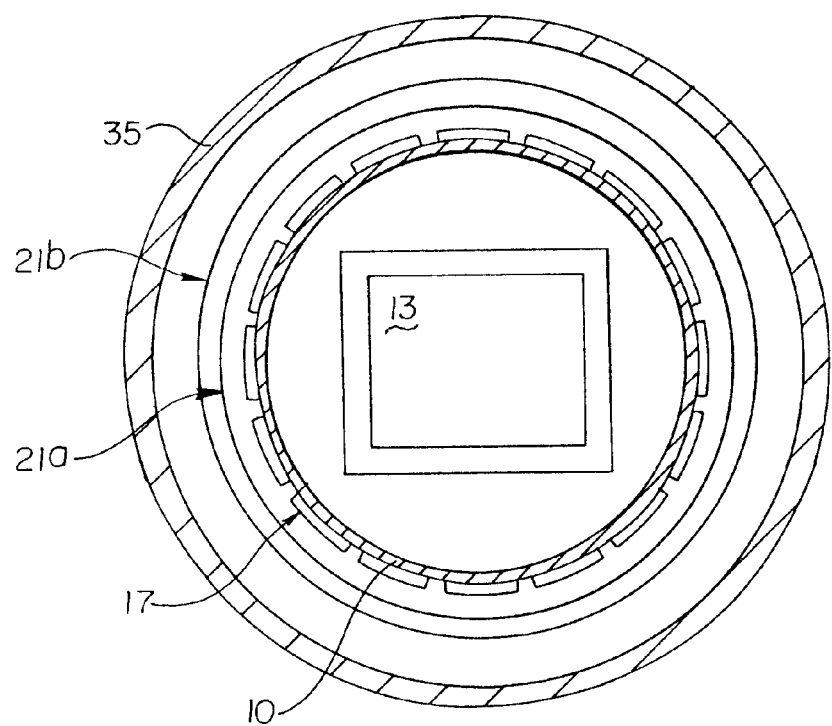
FIG. 2 is a transverse cross-section of said device taken on plane II—II of FIG. 1, looking in the direction of the arrows.

An embodiment of the present invention will now be described by way of example with reference to the drawings FIG. 1 and FIG. 2. For the sake of clarity, the figures are on an enlarged scale.

The IR detector device of this embodiment comprises an upwardly tapering cold shield 10, having, in this embodiment, a lowermost and an uppermost cylindrical section and an intermediate frusto-conical section, and which is preferably made of an electrically insulating material 11 having high thermal conductivity. Cold shield 10 supports, at its wider end, a ceramic bed 12 and at its narrower end an optical filter 14, which functions as a shielding surface against parasitic radiation. Its inner surface is coated with high emissivity material represented by the dashed line in FIG. 1, noted as numeral 9, which serves as a reflective radiation protector, and electrical leads characterized by low emissivity (such as gold) are printed on its outer surface, as schematically indicated in broken lines at 17. On ceramic bed 12 is mounted a detector 13 constituted by a two-dimensional matrix of detector elements. Filter 14 passes IR radiation that is in the sensitivity range, which may vary and may be e.g. in the range 3–5 $\mu$m or 8–12 $\mu$m. The cold shield 10 is mounted inside a casing, generally indicated at 15, in which is also mounted the cooler device, hereinafter described. An optical window 16 is mounted on window housing 18 opposite filter 14.

The cooler device operates by Joule-Thomson effect. A preferably finned cooler pipe, coiled in spiral configuration, comprises two serially connected pipe sections 20a and 20b. Section 20a is contained within a pre-cooling jacket section 21 formed by an outer wall 21b and an inner wall 21a, which are tapered, from the middle to the lower end of the device, towards its axis, and, in this embodiment have upper cylindrical walls followed by frusto-conical walls. The lower end of the device is considered to be, in this description, the end opposite to the optical window 16. Section 20b of the cooler pipe is contained within a pre-cooling jacket section 22 formed by an outer wall 22a and an inner wall 22b, which are enclosed within the space defined by said inner wall 21a and, in this embodiment, are cylindrical. All of said walls are defined by metal plates. Wall 22a is completed by top plate 29 and by bottom plate 23a and wall 22b by a top plate 23. Pipe sections 20a and 20b are connected by pipe segment 26. Pipe section 20a and 20b have a gas inlet at 27 and an expansion nozzle 32 discharging the gas into space 33 defined by plates 29 and 24. Second jacket 22 has an inlet at space 33 and a discharge outlet into the first jacket at 34.

The inner wall 21a, the outer wall 22a, plates 29 and 23a, optical window 16 and its housing 18, which is the upper part of casing 15, define a first Dewar space 30 in which a vacuum is created, though a suitable port such as 31 and vacuum means, not illustrated. The inner surface of casing 15, the outer surface of wall 21b and plate 23 defines a second Dewar space 35 in which a vacuum is created by similar means. A vacuum jacket or other insulating means provided thermal insulation of the Dewar spaces from the environment.

The gas is preferably chosen from air, nitrogen, argon, krypton or mixtures thereof. The gas, under pressure e.g. of 150 to 1000 atm, is fed to pipe section 20a through inlet 27 and flow through it until it reaches nozzle 32, expands into space 33, and cools ceramic plate 12 and therefore detector 13. From space 33, the gas enters second section 22 of the pre-cooling jacket, flows through it in heat-exchange contact with pipe section 20b; then, through space 34 bounded by plates 23 and 23a, the gas enters first section 21 of the pre-cooling jacket, flows through it in heat-exchange contact with pipe section 20a, and finally is discharges through vent 28. Thus the cooling gas, flowing through the pipe spirals, is pre-cooled before expanding through the Joule-Thomson nozzle. In view of the considerable length of the pipe spirals 20a and 20b, provided by the structure of the invention while maintaining a low volume of the cooler device, and of the prevention of heat losses provided by the vacuum spaces surrounding the heat-exchange jackets and other parts of the device, a more efficient cooling is achieved.

The IR detector device is provided with an electrical circuit (not shown), which receives, processes and transmits the signals generated by the detector elements. The signals from said circuit are transmitted to the outside of the detector device through the aforesaid leads 17, which extend from the base of the cold shield, viz. the level of the detector 13, to the top of the cold shield, viz. the level of the filter. They are connected to the outside through discrete wires, indicated at 36, bonded to a ceramic feedthrough unit 39. A flexible or rigid PCB is then used to transmit the signals from the ceramic feedthrough unit to the outer section of the electronics. The flexible PCB is preferably printed on a sheet of insulated flexible material such as KEPTON. The rigid PCB is preferably printed on a rigid insulated material, such as Glass Epoxy.

It is seen that the invention provides an IR detector device of reduced size, thanks to the fact that the Joule-Thomson microcooler components—the cooling spiral and its pre-cooling jacket, are, so to speak, bent back upon themselves. The pre-cooling jacket comprises two, serially connected, sections, which enclose two corresponding, serially connected, spiral pipe sections, one of said pre-cooling jacket sections—inner section—being contained in the space bound by the other—outer—section, and therefore not contributing to the overall volume of the detector device. Preferably, for a further reduction of said space, a portion of the cold shield extends into said space, said outer precooling jacket section begin conformed so as to accommodate said cold shield portion. The resulting compact IR detector assembly is stable and rigid. These features, and its reduced volume, render it particularly suitable when said detector assembly is intended for use in flying objects, such as missiles.

The fact that the electrical connection to the outside is obtained through a component which is part of or fixed to the housing close to the optical window, is another valuable feature of a preferred embodiment of the invention.

The fact that the wiring 17 is formed on the outside of the cold shield and exits the device in the vicinity of the optical window contributes to the compact overall dimensions of the device and of its outer diameter in particular.

The following data are given by way of example, and not of limitation.

The overall dimensions of the device according to the invention depend on the size of the detector elements matrix array. The following examples can be given: for a 64×64 matrix, a length of 28 mm, an outer diameter of 20 mm, and a length of the spiral cooler tube of 900 mm; for a 320×256 matrix, a length of 45 mm, an outer diameter of 27 mm, and a length of the spiral cooler tube of 1500 mm. The wall thickness of the precooling jackets can be e.g. 0.07 mm and that of cooler spiral pipe can be e.g. 0.075 mm. Suitable material for the cooler spiral pipe and casing are e.g. steel, copper and nickel. The cold shield is preferably made of electrically insulating material having high thermal conductivity, e.g. ceramic material.

The Joule-Thomson cooler system, that is part of the IR detector of the invention, can be one of the following types: free flow non-regulated; demand flow self-regulated; demand flow Focal Plane Array (FPA) temperature controlled by using its readout to control the flow by means of a mechanical regulating mechanism. The demand flow self-regulated type usually needs an extra volume at the expansion nozzle vicinity for the self-regulation system. The Joule-Thomson cooler system that is part of the IR detector of this invention can contain any known regulating mechanism, such as are used in similar device to regulate the flow of the gas through the expansion orifice.

While an embodiment of the invention has been described by of illustration, it will be apparent that many modifications, variations and adaptations may be made therein by persons skilled in the art, without departing from the spirit of the invention or exceeding the scope of the claims.

What is claimed is:

1. An infrared radiation (IR) detector device defining an overall volume, comprising:
    a) a casing, having an optical window for admitting radiation;
    b) a cold shield, disposed within the casing, having a detector mounted therein and having a filter mounted between the optical window and the detector;
    c) a cooler tube in coiled configuration, disposed within the casing, having an inlet in communication with a pressurized gas source and an expansion nozzle located in the vicinity of said detector; said cooler pipe comprising two serially connected pipe sections, a first section beginning at the inlet to said gas source and a second section terminating at said expansion nozzle;
    d) a pre-cooling jacket, enclosing the cooler tube and having a gas inlet in the vicinity of the detector and a gas discharge vent to the outside; and
    e) wherein said pre-cooling jacket comprises two serially connected sections, a first section, containing said first cooler pipe section, and formed by an outer wall and an inner wall wherein said outer wall is completed by a plate, and a second section, containing said second cooler pipe section, and formed by an outer wall and an inner wall, wherein said outer wall is completed by a top plate and said inner wall is completed by a bottom plate;
    f) said pre-cooling jacket is bent back upon itself such that said second section of said jacket, containing said second section of said cooler pipe is enclosed within the space bound by said first section of said pre-cooling jacket containing said first section of said cooler pipe, whereby said second section of said jacket, containing said second section of said cooler pipe is circumscribed within the overall volume of said detector device.

2. The infrared radiation (IR) detector device according to claim 1, wherein a portion of the cold shield extends into the inner space bounded by the first section of the pre-cooling jacket.

3. The infrared radiation (IR) detector device according to claim 2, wherein the first section of the pre-cooling jacket is tapered outwardly from its communication with the second section of the pre-cooling jacket.

4. The infrared radiation (IR) detector device according to claim 1, wherein the first section of the pre-cooling jacket therefore is tapered outwardly from its communication with the second section of the pre-cooling jacket.

5. The infrared radiation (IR) detector device according to claim 1, further comprising means for creating and maintaining a vacuum in a space bounded by the casing and by the outer surface of the first section of the pre-cooling jacket.

6. The infrared radiation (IR) detector device according to claim 1, further comprising means for creating and maintaining a vacuum in a space bounded by the inner surface of the first section of the pre-cooling jacket, the outer surface of the second section of the pre-cooling jacket, the inner surface of the first section of the pre-cooling jacket, a top plate and the optical window.

7. The infrared radiation (IR) detector device according to claim 1, wherein the detector is mounted at one end of the cold shield in the vicinity of the outlet orifice of the cooler tube.

8. The infrared radiation (IR) detector device according to claim 1, wherein the detector comprises a matrix of IR radiation detector elements.

9. The infrared radiation (IR) detector device according to claim 8, further comprising a filter between the cold shield and the detector to filter out radiation that is not in the sensitivity range of the detector elements.

10. The infrared radiation (IR) detector device according to claim 1, further comprising an electric circuit connected to the detector and conductors that connect said electric circuit to the outside, wherein the conductors are located on the outer surface of the cold shield.

11. The infrared radiation (IR) detector device according to claim 10, wherein the conductors lead from the end of the cold shield on which the detector is mounted to the end thereof on which the filter is mounted.

12. The infrared radiation (IR) detector device according to claim 11, wherein the conductors are electrically connected to a conductive component that is close to the level of optical window, through which the electrical signals issue from the device.

* * * * *